United States Patent
Meng

(10) Patent No.: US 11,462,013 B2
(45) Date of Patent: Oct. 4, 2022

(54) METHOD AND APPARATUS FOR RECOGNIZING TARGET OBJECT, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Meiling Meng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 16/943,479

(22) Filed: Jul. 30, 2020

(65) Prior Publication Data

US 2021/0110160 A1 Apr. 15, 2021

(30) Foreign Application Priority Data

Oct. 10, 2019 (CN) .......................... 201910959720.3

(51) Int. Cl.
| | | |
|---|---|---|
| *G06F 3/048* | (2013.01) | |
| *G06V 20/20* | (2022.01) | |
| *G06F 3/04815* | (2022.01) | |
| *G06K 9/62* | (2022.01) | |

(52) U.S. Cl.
CPC .......... *G06V 20/20* (2022.01); *G06F 3/04815* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 7,848,549 B2 | 12/2010 | Steinberg et al. | |
| 9,875,258 B1 * | 1/2018 | Hsiao | G06F 16/532 |
| 2013/0265421 A1 | 10/2013 | Jia et al. | |
| 2020/0242841 A1 * | 7/2020 | Diament | G06T 17/05 |

OTHER PUBLICATIONS

European Patent Application No. 20185964.2 dated Dec. 22, 2020, 6 pages.

* cited by examiner

*Primary Examiner* — William C Trapanese
(74) *Attorney, Agent, or Firm* — Lathrop GPM LLP

(57) ABSTRACT

The present disclosure provides a method and an apparatus for recognizing a target object, an electronic device and a storage medium, relating to a field of artificial intelligence. The method includes the following. A target object is recognized from a first image displayed by an imaging camera. A first recognition result of the target object is obtained. The first recognition result of the target object is displayed in the first image. A second recognition result of the target object is obtained and displayed to replace the first recognition result.

18 Claims, 3 Drawing Sheets

METHOD AND APPARATUS FOR RECOGNIZING TARGET OBJECT, ELECTRONIC DEVICE AND STORAGE MEDIUM

CROSS REFERENCE TO RELATED APPLICATION

This application claims priority and benefits to Chinese Patent Application No. 201910959720.3, filed on Oct. 10, 2019, the entire content of which is incorporated herein by reference.

TECHNICAL FIELD

The present disclosure relates to a field of computer applications, and more particularly, to a method and an apparatus for recognizing a target object, to an electronic device and to a storage medium in an artificial intelligence field.

BACKGROUND

Currently, some products may be provided with image recognition function. However, users are typically required to perform the following operations to activate the image recognition function: launching an image recognition plug-in, clicking an imaging button, uploading the image, and initiating the image recognition in sequence.

SUMMARY

Embodiments of the present disclosure provide a method and an apparatus for recognizing a target object, an electronic device and a storage medium.

The method for recognizing a target object includes recognizing one or more target objects from a first image displayed by an imaging camera; obtaining first recognition results of the one or more target objects; displaying the first recognition results of the one or more target objects in the first image; and obtaining second recognition results of the one or more target objects, replacing the first recognition results with the second recognition results, and displaying the second recognition results.

In some embodiments, each first recognition result includes a coarse classification recognition result, each second recognition result includes a fine recognition result, and the fine recognition result is a refined classification result of the coarse classification recognition result.

In some embodiments, the method further includes: filtering the one or more target objects recognized based on a filtering rule set in advance to obtain a filtered target object; and displaying the first recognition result of the filtered target object in the first image, and obtaining a second recognition result of the filtered target object.

In some embodiments, the filtering rule includes filtering out a target object whose size does not meet requirements, and/or, filtering out a target object whose position do not meet requirements.

In some embodiments, the method further includes: for each target object, while displaying the first recognition result of the target object, displaying an icon corresponding to the first recognition result of the target object.

In some embodiments, the method further includes: for each target object, displaying, through a predetermined animation effect, the first recognition result of the target object and the icon corresponding to the first recognition result in a region of the first image where the target object is located.

In some embodiments, the method further includes: for each target object, obtaining a representative image corresponding to the second recognition result of the target object, and replacing the icon to display the representative image.

In some embodiments, the method further includes: for each target object, obtaining detailed information of the target object containing predetermined content, and when determining that a user clicks on the representative image or the second recognition result of the target object, additionally displaying the detailed information of the target object.

In some embodiments, additionally displaying the detailed information of the target object includes: dividing a displaying page into two sub-pages, displaying the first image on a sub-page, and displaying the detailed information of the target object on the other sub-page.

In some embodiments, the method further includes: when it is determined that the first image is switched to the second image, for a repeated target object that is contained in both the first image and the second image, directly displaying the second recognition result of the repeated target object in the second image; and for a new target object that is only contained in the second image, obtaining the first recognition result of the new target object and displaying the first recognition result of the new target object in the first image, obtaining the second recognition result of the new target object and replacing the first recognition result with the second recognition result and displaying the second recognition result.

The electronic device according to embodiments of the present disclosure includes at least one processor, and a memory connected in communication with the at least one processor. The memory has instructions executable by the at least one processor stored therein.

When the instructions are executed by the at least one processor, the at least one processor are caused to implement the method as described above.

The non-transitory computer-readable storage medium according to embodiments of the present disclosure has computer instructions stored therein. When the computer instructions are configured to cause a computer to implement the method as described above.

Additional effects of the foregoing descriptions will be described below in combination with some embodiments.

BRIEF DESCRIPTION OF THE DRAWINGS

The accompanying drawings are used to better understand the solution, and do not constitute a limitation on the present disclosure, in which.

DETAILED DESCRIPTION

Figure 1:
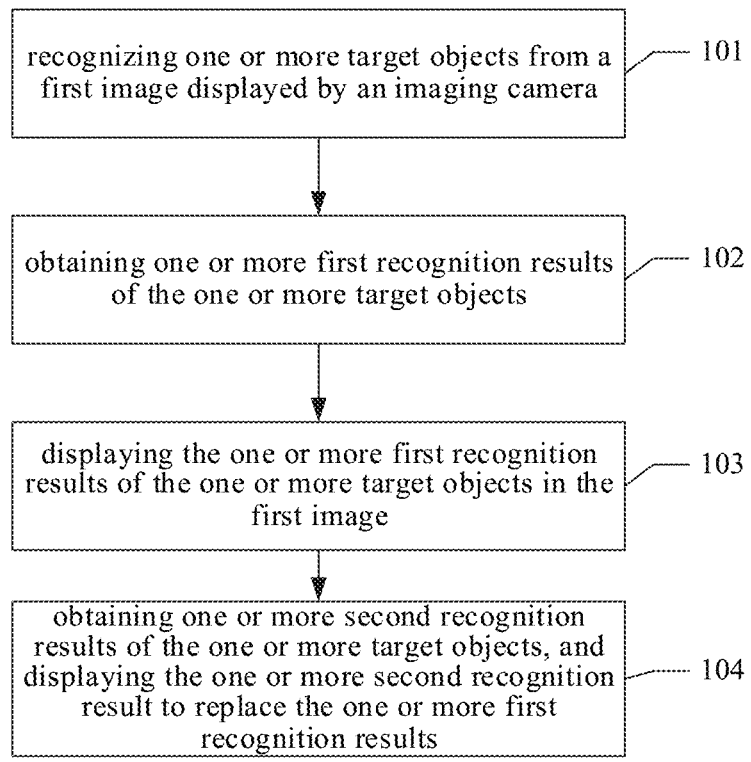
FIG. 1 is a flowchart illustrating a method for recognizing a target object according to embodiments of the present disclosure.

Exemplary embodiments of the present disclosure will be described below with reference to the accompanying drawings, including various details of embodiments of the present disclosure for understanding, which shall be considered merely exemplary. Therefore, those of ordinary skill in the art should recognize that various changes and modifications may be made to the embodiments described herein without departing from the scope and spirit of the present disclosure. For clarity and conciseness, descriptions of well-known functions and structures are not described in the following description.

In addition, it is noted that term "and/or" are used only to describe a relation of related objects, including three relations. For example, "A and/or B" indicates only A exists, A and B both exist, and only B exists. The character "/" generally indicates that it is either the former related object or the latter related object.

When performing the image recognition, if there are multiple images to be recognized, the user needs to repeat operations for activating the image recognition functions for multiple times. In addition, it is usually only possible to identify a single target object currently. When there are multiple target objects contained in the image, a most likely target object may be determined based on a location and an area for identification. If the user's requirement is not satisfied, the user is required to manually select the target object to be recognized. In conclusion, the existing image recognition method is complicated to operate and has low efficiency.

Therefore, embodiments of the present disclosure provide a method and an apparatus for recognizing a target object, a related device and storage medium.

Embodiments of the present disclosure may have the following advantages or beneficial effects.

The target objects contained in the first image displayed by the imaging camera may be directly recognized without a series of complicated operations of the user. The first recognition result and the second recognition result of the target object may be displayed in sequence. The first recognition result may be the coarse classification recognition result, and the second recognition result may be the fine recognition result. The above operations may be performed on multiple target objects included in the first image simultaneously, which not only reduces implementation complexity, but also increases recognition efficiency. The existing recognition method of "updating and selecting by users for recognition" is changed to the recognition method of "actively informing results of coarse classification and fine recognition", which realizes a major change that a physical world actively presents an information world.

By displaying the coarse classification recognition result, the user may quickly make a preliminary understanding on the target object, which may relieve feeling of waiting and anxiety of the user while the user is waiting for the fine recognition result.

The target objects recognized may be filtered based on the filtering rule determined in advance, to reduce workload of subsequent processing.

While the coarse classification recognition result and the fine recognition result of the target object are displayed, the icon and representative image are displayed respectively, thereby enriching the displaying content and allowing the user to have an intuitive understanding of the target object.

While the coarse classification recognition result of the target object and the icon corresponding to the coarse classification recognition result are displayed, the predetermined animation effect may also be used to reduce unsmooth feeling of the user.

When the user clicks on the representative image or the fine recognition result of any target object, the detailed information of the target object may be additionally displayed to allow the user to have a deep understanding on the target object, without affecting the recognition process.

When the displaying page is switched, the new target object may be quickly recognized, and the fine recognition results of the existing target objects may be retained in the original image, so as to realize the human eyes-like browsing recognition.

The method and an apparatus for recognizing a target object, a related electronic device and storage medium will be described below.

FIG. 1 is a flowchart illustrating a method for recognizing a target object according to embodiments of the present disclosure. As illustrated in FIG. 1, the method may include the following.

At block 101, target objects are recognized from a first image displayed by an imaging camera.

At block 102, first recognition results of the target objects are obtained.

At block 103, the first recognition results of the target objects are displayed in the first image.

At block 104, second recognition results of the target objects are obtained, the first recognition results are replaced with the second recognition results, and the second recognition results are displayed.

In an example, each first recognition result is a coarse classification recognition result, and each second recognition result is a fine recognition result. The fine recognition result is a refined classification result of the coarse classification recognition result. In the embodiment described above and subsequent embodiments below, the coarse classification recognition result and the fine recognition result are taken as examples for description.

The method for recognizing a target object may be initiated by a user through a designated entrance, for example by clicking on an imaging icon of a predetermined application (APP) installed on the mobile phone, to process an image displayed by the imaging camera with the method according to embodiments of the present disclosure. For ease of description, any image displayed by the imaging camera may be referred to as the first image.

Target object recognition may be performed on the first image. That is, the target objects contained in the first image can be recognized to obtain sizes and positions of the target objects. One or more target objects may be recognized. The method for recognizing the target object is not limited, and an existing target detection/recognition method may be used.

The coarse classification recognition result of each recognized target object may be obtained respectively. Predetermined characteristic parameters of each target object may be obtained respectively. The predetermined characteristic parameters of each target object may be input into a classification model that is trained in advance, to obtain the coarse classification recognition result of the target object. Certainly, the above is only an example and is not intended to limit the technical solution of the present disclosure. It is also possible to obtain the coarse classification recognition result of the target object in other manners.

Further, the coarse classification recognition results of the recognized target objects may be displayed in the first image.

In an example, the recognized target objects may be filtered based on a filtering rule determined in advance to obtain a filtered target object. Accordingly, the coarse classification recognition result of the filtered target object may be displayed only in the first image.

The filtering rule may be defined in advance. That is, which target object needs to be filtered out may be defined in advance. For example, the filtering rule includes, but is not limited to, filtering out a target object whose size does not meet requirements, and/or, filtering out a target object whose position do not meet requirements. The target object whose size does not meet requirements may refer to a target object that is too small. For example, the number of pixels contained in the target object is less than a predetermined threshold. The target object whose position does not meet requirements may refer to a target object located at a corner of the first image. For example, the target object is located at an upper left corner of the first image. That is, the target object deviates from the user's main visual range.

By displaying the coarse classification recognition result, the user can quickly make a preliminary understanding on the target object, and the feeling of waiting and anxiety of the user may be relieved while the user is waiting for the fine recognition result. In addition, the user may be directed to know the boundary of class recognition capability. In addition, by filtering out the target objects that do not meet requirements, the workload of subsequent processing can be reduced.

For any of the target objects, an icon corresponding to the coarse classification identification result of the target object may be displayed while displaying the coarse classification identification result of the target object, which may enrich the displaying content and allow the user to understand the target object intuitively.

For any of the target objects, the coarse classification recognition result of the target object and the corresponding icon may be displayed with a predetermined animation effect in a region of the first image where the target object is located. For example, a small circle may be displayed firstly. The small circle may be gradually enlarged. A large circle obtained by enlarging the small circle may have the icon corresponding to the coarse classification recognition result of the target object therein, and the icon corresponding to the coarse classification recognition result may be displayed below the large circle. The animation effect may reduce the unsmooth feeling of the user. Positions of displaying the coarse classification recognition result and the corresponding icon in the region where the target object is located are not limited, which may be determined according to actual requirements.

For the target objects displayed in the first image, the fine recognition results may be obtained respectively, and the fine recognition result may be displayed by replacing the coarse classification recognition result. For example, for any one of the target objects, a rectangular sub-image containing the target object that has a minimum area may be used as an input for searching. That is, a network request of image searching may be initiated to obtain a search result. The search result may include a fine recognition result of the target object, i.e., a refined classification recognition result.

The above search result may also include the representative image corresponding to the fine recognition result of the target object. Accordingly, the representative image may be displayed by replacing the icon corresponding to the coarse classification recognition result. By displaying the representative image, the displaying content may be enriched, which is convenient for the user to understand the target objects intuitively.

Based on the above processes, the target objects may be directly recognized from the first image displayed by the imaging camera without performing a series of complicated operations by the user. The coarse classification recognition result and the fine classification recognition result of the target object may be displayed in sequence. The above operations can be performed on multiple target objects included in the first image simultaneously, which not only reduces implementation complexity, but also increases recognition efficiency. The existing recognition method of "updating and selecting by users for recognition" is changed to the recognition method of "actively informing results of coarse classification and fine recognition", which realizes a major change that a physical world actively presents an information world.

For any one of the target objects, in addition to the fine identification result of the target object and the representative image corresponding to the fine identification result of the target object, the obtained search result may further include detailed information of the target object that includes predetermined information. In this way, when it is determined that the user clicks on the representative image or the fine recognition result of the target object, the detailed information of the target object may be additionally displayed.

For example, the displaying page may be divided into sub-pages. The first image may be displayed on one sub-page, and the detailed information of the target object may be displayed on the other sub-page. Dividing the displaying page may include dividing the displaying page into an upper sub-page and a lower sub-page. For example, the detailed information of the target object may be displayed by sliding a half of page from the bottom to the top. The content of the detailed information displayed may be determined according to actual requirements.

By displaying the detailed information of the target object, the user may have a deep understanding on the target object without affecting the recognition process.

When the image is switched, for example, the first image is switched to the second image, for a repeated target object that is contained in both the first image and the second image, the fine recognition result of the repeated target object may be directly displayed in the second image. For a new target object that is not contained in the first image but contained in the second image, the coarse classification recognition result of the new target object may be obtained and displayed in the second image. In addition, the fine recognition result of the new target object may be obtained and displayed to replace the coarse classification recognition result. Similarly, for the new target object, when the coarse classification recognition result of the new target object is displayed, the icon corresponding to the coarse classification recognition result may be displayed simultaneously. When the fine recognition result is displayed, the representative image corresponding to the fine recognition result may be displayed simultaneously. The repeated target object that is contained in both the first image and the second image may be determined by such as a target tracking technique.

In other words, when the image is switched, the new target object may be quickly recognized, and the fine recognition result of an existing target object contained in the original image may be retained, thereby realizing human eyes-like browsing recognition. In addition, the user may be directed to adjust the imaging camera to focus on his/her desired target subject, thereby effectively improving efficiency of determining user's intention.

Figure 2:
FIG. 2 is a schematic diagram illustrating a manner for displaying a coarse classification recognition result of a target object and a corresponding icon according to embodiments of the present disclosure.

Based on the above descriptions, FIG. 2 is a schematic diagram illustrating a manner for displaying a coarse classification recognition result of a target object and a corresponding icon according to embodiments of the present disclosure. As illustrated in FIG. 2, a single target object is recognized from the first image. For the recognized target object, the coarse classification recognition result of the target object and the corresponding icon may be displayed with a predetermined animation effect in a region of the first image where the target object is located. For example, a small circle is displayed. The small circle is gradually enlarged. The icon corresponding to the coarse classification recognition result may be displayed within the large circle obtained by enlarging the small circle. For example, the icon composed of "a flowerpot and leaves" illustrated in FIG. 2 is displayed in the large circle, and the coarse classification recognition result (i.e., "green plant" illustrated in FIG. 2) is displayed below the large circle. Before the fine recognition result is displayed, the curve adjacent to periphery of the large circle may be rotated around the large circle to smooth a stutter feeling of the user.

Figure 3:
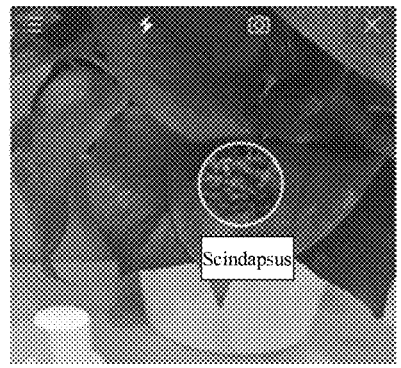
FIG. 3 is a schematic diagram displaying a fine recognition result of a target object and a corresponding representative image according to embodiments of the present disclosure.

FIG. 3 is a schematic diagram displaying a fine recognition result of a target object and a corresponding representative image according to embodiments of the present disclosure. As illustrated in FIG. 3, after the fine recognition result (i.e., Scindapsus) of the target object is obtained as illustrated in FIG. 2, the fine recognition result "Scindapsus" is displayed to replace the coarse classification recognition result "green plant", and the representative image corresponding to "Scindapsus" is displayed to replace the icon corresponding to "green plant". Then, when the user clicks on the "Scindapsus" or the corresponding representative image, the detailed information of "Scindapsus" may be displayed additionally. For example, the detailed information of "Scindapsus" may be displayed by sliding the displaying page from the bottom to the top.

Figure 4:
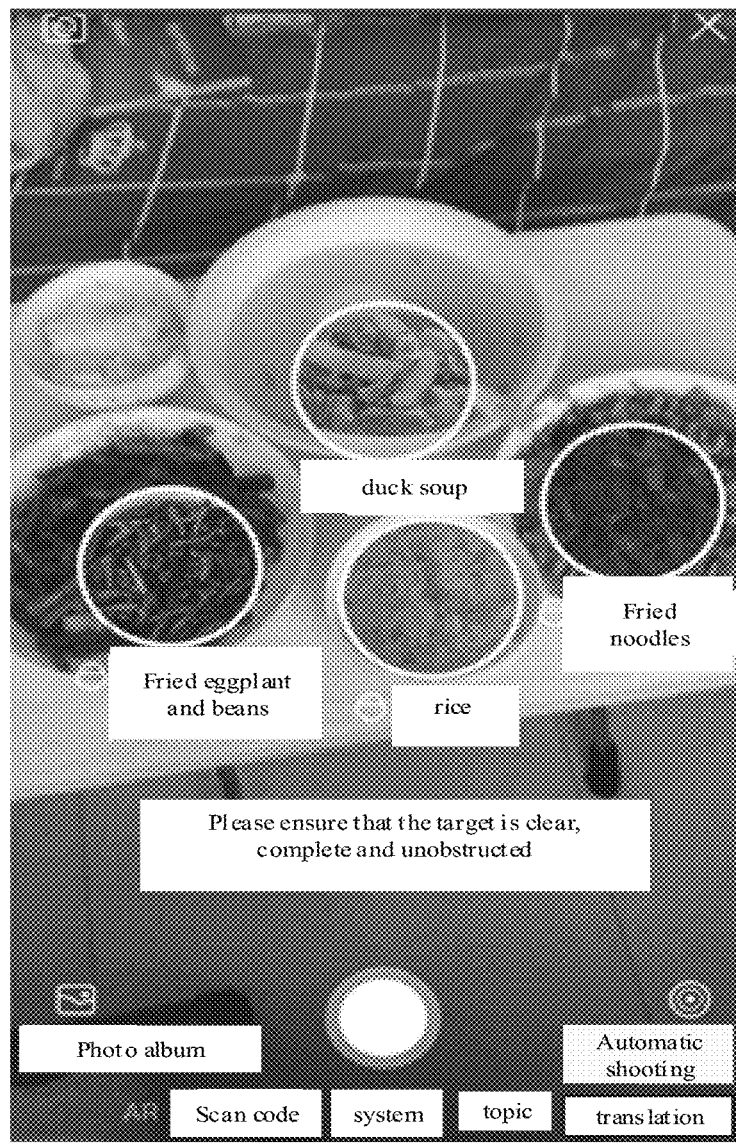
FIG. 4 is a schematic diagram displaying fine recognition results of multiple target objects and corresponding representative images according to embodiments of the present disclosure.

A case that a single target object is recognized is taken as an example for illustration in FIGS. 2 and 3. FIG. 4 is a schematic diagram displaying fine recognition results of multiple target objects and corresponding representative images according to embodiments of the present application. As illustrated in FIG. 4, for the multiple target objects contained in the image, the fine recognition results of target objects and corresponding representative images may be displayed respectively.

The above descriptions are related to method embodiments. In the following, the solution of the present disclosure may be further described for device embodiments.

Figure 5:
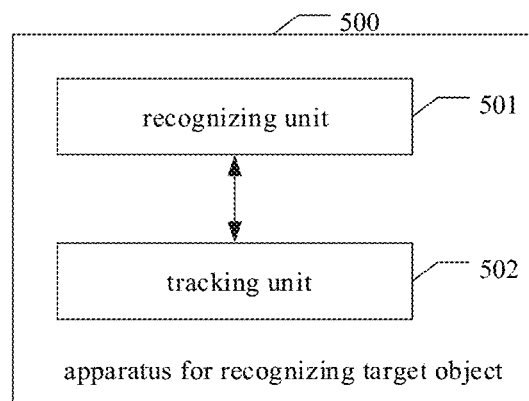
FIG. 5 is a schematic diagram illustrating structural components of an apparatus 500 for recognizing a target object according to embodiments of the present disclosure.

FIG. 5 is a schematic diagram illustrating structural components of an apparatus 500 for recognizing a target object according to embodiments of the present disclosure. As illustrated in FIG. 5, the apparatus may include a recognizing unit 501.

The recognizing unit 501 is configured to recognize one or more target objects from a first image displayed by an imaging camera, obtain coarse classification recognition results of the one or more target objects; display the coarse classification recognition results of the one or more target object in the first image; and obtain fine recognition results of the one or more target objects, display the fine recognition results to replace the coarse classification recognition results.

The recognizing unit 501 may be configured to perform target object recognition on the first image. That is, the recognizing unit 501 may be configured to recognize the target objects existing in the first image. Sizes and positions of the target objects may be obtained. There may be one or more recognized target objects.

The recognizing unit 501 may be further configured to obtain the coarse classification recognition results of the one or more target object recognized respectively. Further, the coarse classification recognition results of the one or more target objects recognized may be displayed in the first image.

In an example, for the one or more target objects recognized, the recognizing unit 501 may be further configured to filter the one or more target objects recognized based on a filtering rule determined in advance to obtain a filtered target object, and display the coarse classification recognition result of the filtered target object in the first image.

The filtering rule may be defined in advance. That is, which of the target objects needs to be filtered out can be defined in advance. For example, the filtering rule may include, but be not limited to, filtering out a target object whose size does not meet requirements, and/or, filtering out a target object whose position do not meet requirements.

The recognizing unit 501 may be further configured to, for any one of the one or more target objects, display an icon corresponding to the coarse classification recognition result of the target object while the coarse classification recognition result of the target object is displayed.

The recognizing unit 501 may be further configured to, for any one of the one or more target objects, display, through a predetermined animation effect, the coarse classification recognition result of the target object and the corresponding icon in a region of the first image where the target object is located.

The recognizing unit 501 may be further configured to, for any one of the one or more target objects, obtain a representative image corresponding to the fine recognition result of the target object, and display the representative image to replace the icon.

The recognizing unit 501 may be further configured to, for any one of the one or more target objects, obtain detailed information of the target object containing predetermined content, and when determining that a user clicks on the representative image or the fine recognition result of the target object, additionally display the detailed information of the target object.

For example, the recognizing unit 501 may be configured to divide a display page into sub-pages, display the first image on one sub-page, and display the detailed information of the target object on the other sub-page.

The apparatus illustrated as FIG. 5 may further include a tracking unit 502. The tracking unit 205 may be configured to, when it is determined that the first image is switched to the second image, determine a repeated target object that is contained in both the first image and the second image.

Accordingly, the recognizing unit 501 may be further configured to, for the repeated target object that is contained in both the first image and the second image, directly display the fine recognition result of the repeated target object in the second image; and for a new target object that is only contained in the second image, obtain the coarse classification recognition result of the new target object and display the coarse classification recognition result of the new target object in the second image, obtain a fine recognition result of the new target object and display the fine recognition result to replace the coarse classification recognition result. Similarly, for the new target object, when the coarse classification recognition result of the new target object is displayed, the icon corresponding to the coarse classification recognition result may be displayed also. Furthermore, when the fine recognition result is displayed, the representative image corresponding to the fine recognition result may be displayed also.

The specific processes of the device embodiment illustrated in FIG. 5 may be referred to the relevant descriptions in the foregoing method embodiments, which is not repeated.

According to embodiments of the present disclosure, an electronic device and a readable storage medium are provided in the present disclosure.

Figure 6:
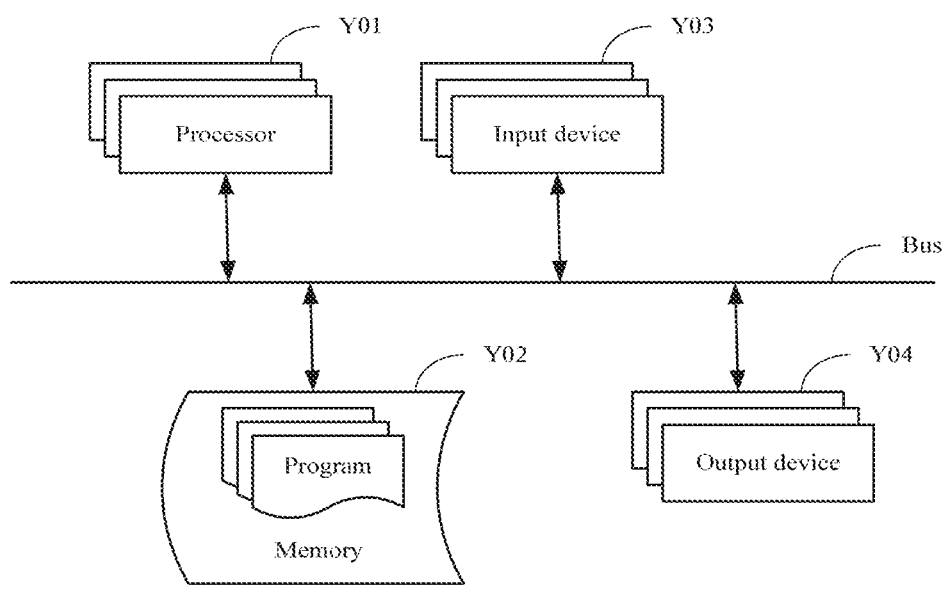
FIG. 6 is a block diagram illustrating an electronic device used to implement the method according to embodiments of the present disclosure.

FIG. 6 is a block diagram illustrating an electronic device used to implement the method according to embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device may include one or more processors Y01, a memory Y02, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor Y01 is taken as an example in FIG. 6.

The memory Y02 is a non-transitory computer-readable storage medium according to the present disclosure. The memory stores instructions executable by at least one processor, so that the at least one processor executes the method according to the present disclosure. The non-transitory computer-readable storage medium of the present disclosure stores computer instructions, which are used to cause a computer to execute the method according to the present disclosure.

As a non-transitory computer-readable storage medium, the memory Y02 is configured to store non-transitory software programs, non-transitory computer executable programs and modules, such as program instructions/modules corresponding to the voice skill creation method in the embodiment of the present disclosure (For example, the xx module X01, the xx module x02 and the xx module x03 shown in the drawing X). The processor Y01 executes various functional applications and data processing of the server by running non-transitory software programs, instructions, and modules stored in the memory Y02, that is, implementing the method in the foregoing method embodiment.

The memory Y02 may include a storage program area and a storage data area, where the storage program area may store an operating system and application programs required for at least one function. The storage data area may store data created according to the use of the electronic device, and the like. In addition, the memory Y02 may include a high-speed random access memory, and a non-transitory memory, such as at least one magnetic disk storage device, a flash memory device, or other non-transitory solid-state storage device. In some embodiments, the memory Y02 may optionally include a memory remotely disposed with respect to the processor Y01, and these remote memories may be connected to the electronic device through a network. Examples of the above network include, but are not limited to, the Internet, an intranet, a local area network, a mobile communication network, and combinations thereof.

The electronic device may further include an input device Y03 and an output device Y04. The processor Y01, the memory Y02, the input device Y03, and the output device Y04 may be connected through a bus or in other manners. In FIG. 6, the connection through the bus is taken as an example.

The input device Y03 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device Y04 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical embodiments of the present disclosure, the target objects contained in the first image displayed by the imaging camera may be directly recognized without a series of complicated operations of the user. The coarse classification recognition result and the fine recognition result of the target object may be displayed in sequence. The above operations may be performed on multiple target objects included in the first image simultaneously, which not only reduces implementation complexity, but also increases recognition efficiency. The existing recognition method of "updating and selecting by users for recognition" is changed to the recognition method of "actively informing results of coarse classification and fine recognition", which realizes a major change that a physical world actively presents an information world. By displaying the coarse classification recognition result, the user may quickly make a preliminary understanding on the target object, which may relieve feeling of waiting and anxiety of the user while the user is waiting for the fine recognition result. The target objects recognized may be filtered based on the filtering rule determined in advance, to reduce workload of subsequent processing. While the coarse classification recognition result and the fine recognition result of the target object are displayed, the icon and representative image are displayed respectively, thereby enriching the displaying content and allowing the user to have an intuitive understanding of the target object. While the coarse classification recognition result of the target object and the icon corresponding to the coarse classification recognition result are displayed, the predetermined animation effect may also be used to reduce unsmooth feeling of the user. When the user clicks on the representative image or the fine recognition result of any target object, the detailed information of the target object may be additionally displayed to allow the user to have a deep understanding on the target object, without affecting the recognition process. When the displaying page is switched, the new target object may be quickly recognized, and the fine recognition results of the existing target objects may be retained in the original image, so as to realize the human eyes-like browsing recognition.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for recognizing a target object, comprising:
   recognizing one or more target objects from a first image displayed by an imaging camera;
   obtaining one or more first recognition results of the one or more target objects;
   displaying the one or more first recognition results of the one or more target objects in the first image;
   obtaining one or more second recognition results of the one or more target objects, and displaying the one or more second recognition results to replace the one or more first recognition results; and
   in response to determining that the first image is switched to a second image, for a repeated target object that is contained in both the first image and the second image, directly displaying the second recognition result of the repeated target object and for a new target object that is not contained in the first image but contained in the second image, obtaining the first recognition result of the new target object and displaying the first recognition result of the new target object in the second image, and obtaining the second recognition result of the new target object and displaying the second recognition result of the new target object to replace the first recognition result.

2. The method according to claim 1, wherein,
   each first recognition result comprises a coarse classification recognition result; and each second recognition result comprises a fine recognition result,
   the fine recognition result is a refined classification result of the coarse classification recognition result.

3. The method according to claim 1, further comprising:
   filtering the one or more target object recognized based on a filtering rule determined in advance to obtain a filtered target object;

displaying the first recognition result of the filtered target object in the first image; and obtaining the second recognition result of the filtered target object.

4. The method according to claim 3, wherein the filtering rule comprises filtering out a target object whose size does not meet requirements, and/or, filtering out a target object whose position does not meet requirements.

5. The method according to claim 1, further comprising: for each target object, displaying an icon corresponding to the first recognition result of the target object while displaying the first recognition result of the target object.

6. The method according to claim 5, further comprising: for each target object, displaying, through a predetermined animation effect, the first recognition result of the target object and the icon of the target object in a region of the first image where the target object is located.

7. The method according to claim 5, further comprising: for each target object, obtaining the representative image corresponding to the second recognition result of the target object, and displaying the representative image to replace the icon.

8. The method according to claim 7, further comprising: for each target object, obtaining detailed information of the target object containing predetermined content, and in response to detecting that the representative image or the second recognition result of the target object is clicked, additionally displaying the detailed information of the target object.

9. The method according to claim 8, wherein additionally displaying the detailed information of the target object comprises:
dividing a displaying page into sub-pages, displaying the first image on one sub-page, and displaying the detailed information of the target object on the other sub-page.

10. An electronic device, comprising:
at least one processor; and
a memory connected in communication with the at least one processor, and having instructions executable by the at least one processor stored therein,
wherein when the instructions are executed by the at least one processor, the at least one processor are configured to:
recognize one or more target objects from a first image displayed by an imaging camera;
obtain one or more first recognition results of the one or more target objects;
display the one or more first recognition results of the one or more target objects in the first image;
obtain one or more second recognition results of the one or more target objects, and display the one or more second recognition results to replace the one or more first recognition results; and
in response to determining that the first image is switched to a second image, for a repeated target object that is contained in both the first image and the second image, directly display the second recognition result of the repeated target object and for a new target object that is not contained in the first image but contained in the second image, obtain the first recognition result of the new target object and display the first recognition result of the new target object in the second image, and obtain the second recognition result of the new target object and display the second recognition result of the new target object to replace the first recognition result.

11. The electronic device according to claim 10, wherein, each first recognition result comprises a coarse classification recognition result; and each second recognition result comprises a fine recognition result,
the fine recognition result is a refined classification result of the coarse classification recognition result.

12. The electronic device according to claim 10, wherein the one or more processors are further configured to:
filter the one or more target object recognized based on a filtering rule determined in advance to obtain a filtered target object;
display the first recognition result of the filtered target object in the first image; and
obtain the second recognition result of the filtered target object.

13. The electronic device according to claim 10, wherein the one or more processors are further configured to:
for each target object, display an icon corresponding to the first recognition result of the target object while displaying the first recognition result of the target object.

14. The electronic device according to claim 13, wherein the one or more processors are further configured to:
for each target object, display, through a predetermined animation effect, the first recognition result of the target object and the icon of the target object in a region of the first image where the target object is located.

15. The electronic device according to claim 13, wherein the one or more processors are further configured to:
for each target object, obtain the representative image corresponding to the second recognition result of the target object, and display the representative image to replace the icon.

16. The electronic device according to claim 15, wherein the one or more processors are further configured to:
for each target object, obtain detailed information of the target object containing predetermined content, and in response to detecting that the representative image or the second recognition result of the target object is clicked, additionally display the detailed information of the target object.

17. The electronic device according to claim 16, wherein the one or more processors are configured to additionally display the detailed information of the target object by:
dividing a displaying page into sub-pages, displaying the first image on one sub-page, and displaying the detailed information of the target object on the other sub-page.

18. A non-transitory computer-readable storage medium, having computer instructions stored thereon, wherein when the computer instructions are executed, the computer is caused to implement a method for recognizing a target object, the method comprises:
recognizing one or more target objects from a first image displayed by an imaging camera;
obtaining one or more first recognition results of the one or more target objects;
displaying the one or more first recognition results of the one or more target objects in the first image; and
obtaining one or more second recognition results of the one or more target objects, and displaying the one or more second recognition results to replace the one or more first recognition results;
in response to determining that the first image is switched to a second image, for a repeated target object that is contained in both the first image and the second image, directly displaying the second recognition result of the repeated target object; and for a new target object that is not contained in the first image but contained in the second image, obtaining the first recognition result of the new target object and displaying the first recognition result of the new target object in the second image, and obtaining the second recognition result of the new target object and displaying the second recognition result of the new target object to replace the first recognition result.

* * * * *